(12) United States Patent
Reeve et al.

(10) Patent No.: US 10,203,858 B2
(45) Date of Patent: Feb. 12, 2019

(54) PORTABLE ELECTRONIC DEVICE AND METHOD OF CONTROLLING THE DISPLAY OF INFORMATION

(71) Applicant: BLACKBERRY LIMITED, Waterloo (CA)

(72) Inventors: Scott David Reeve, Waterloo (CA); Jason Tyler Griffin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 875 days.

(21) Appl. No.: 14/471,790

(22) Filed: Aug. 28, 2014

(65) Prior Publication Data

US 2016/0062619 A1   Mar. 3, 2016

(51) Int. Cl.
*G06F 3/0481* (2013.01)
*G06F 3/0482* (2013.01)
(Continued)

(52) U.S. Cl.
CPC .......... *G06F 3/04847* (2013.01); *G06F 3/021* (2013.01); *G06F 3/044* (2013.01);
(Continued)

(58) Field of Classification Search
CPC .... G06F 3/0481; G06F 3/0482; G06F 3/0483; G06F 9/4443; G06F 2203/04805;
(Continued)

(56) References Cited

U.S. PATENT DOCUMENTS 5,263,134 A * 11/1993 Paal ...................... G06F 3/0485
345/684

6,075,531 A * 6/2000 DeStefano .......... G06F 3/04812
715/788
(Continued)

FOREIGN PATENT DOCUMENTS

EP          2570892 A1   3/2013
WO     2013150998 A1   10/2013
WO     2014104033 A1    7/2014

OTHER PUBLICATIONS

Stack Overflow, winapi—How Do I find position of a Win32 control/window relative to its parent window, Jun. 21, 2014, pp. 2.*
(Continued)

*Primary Examiner* — Kevin L Young
*Assistant Examiner* — Erik V Stitt
(74) *Attorney, Agent, or Firm* — Borden Ladner Gervais LLP; Geoffrey deKleine

(57) ABSTRACT

A method of controlling display of information on a touch-sensitive display of a portable electronic device includes displaying selectable elements in an application screen. The first selectable element is located at a first location and, in response to receipt of an input, entering the display control mode of the portable electronic device. The method also includes, while in the display control mode and in response to receipt of a gesture on keys on a mechanical keyboard, moving, by an operating system on the portable electronic device, the application screen on the touch-sensitive display such that the first selectable element is moved to a second location. In response to detecting a touch at the second location while the first selectable element is displayed at the second location, utilizing, by the application, the touch to select the first selectable element. Returning the application to an original location on the touch-sensitive display when exiting the display control mode.

19 Claims, 5 Drawing Sheets

(51) Int. Cl.
  *G06F 3/0483* (2013.01)
  *G06F 3/0485* (2013.01)
  *G06F 3/0484* (2013.01)
  *G06F 3/0488* (2013.01)
  *G06F 3/044* (2006.01)
  *G06F 3/02* (2006.01)
  *G06F 3/041* (2006.01)
  *G06F 1/16* (2006.01)

(52) U.S. Cl.
  CPC .......... *G06F 3/0412* (2013.01); *G06F 3/0485* (2013.01); *G06F 3/0488* (2013.01); *G06F 3/04842* (2013.01); *G06F 1/1662* (2013.01); *G06F 2203/04806* (2013.01)

(58) Field of Classification Search
  CPC ....... G06F 2203/04806; G06F 3/04886; G06F 3/04883; G06F 3/0236; G06F 3/0238
  See application file for complete search history.

(56) References Cited

U.S. PATENT DOCUMENTS

| | | | | |
|---|---|---|---|---|
| 8,205,150 B2* | 6/2012 | Gelman | ................ | G06F 3/0481 715/229 |
| 8,261,210 B2* | 9/2012 | Dunn | ................ | H04N 5/44513 715/716 |
| 8,694,881 B2* | 4/2014 | Alderucci | ............ | G06F 3/0481 715/229 |
| 8,769,431 B1 | 7/2014 | Prasad | | |
| 9,154,611 B1* | 10/2015 | Jackson | .............. | H04L 41/0253 |
| 2003/0051209 A1* | 3/2003 | Androski | ............... | G06F 17/246 715/217 |
| 2007/0101300 A1* | 5/2007 | Rodden | ................ | G06F 3/0481 715/864 |
| 2010/0257555 A1* | 10/2010 | Dunn | ................ | H04N 5/44513 725/37 |
| 2011/0047461 A1* | 2/2011 | Bargmann | ............ | G06F 3/0481 715/702 |
| 2011/0296329 A1* | 12/2011 | Tanaka | ................. | G06F 1/1647 715/769 |
| 2012/0066640 A1* | 3/2012 | Kwak | ................... | G06F 9/4443 715/788 |
| 2013/0227472 A1* | 8/2013 | Sosinski | ............... | G06F 3/0481 715/794 |
| 2013/0298057 A1* | 11/2013 | Duarte | ................. | G06F 3/0481 715/767 |

OTHER PUBLICATIONS

Extended European Search Report dated Feb. 2, 2016, issued on corresponding EP application No. 15182590.8.
Print out of "Do you like the single handed operation "Free Halt" on ColorOs 2.0?" retrieved on Jul. 22, 2014, from website: http://www.oppoforums.com/threads/do-you-like-the-single-handed-operation-free-halt-on-coloros-2-0.12072/.
European Patent Application No. 15182590.8, Communication pursuant to Article 94(3) EPC dated Nov. 8, 2017.

* cited by examiner

PORTABLE ELECTRONIC DEVICE AND METHOD OF CONTROLLING THE DISPLAY OF INFORMATION

FIELD OF TECHNOLOGY

The present disclosure relates to electronic devices including, but not limited to, portable electronic devices and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. A touch-sensitive input device, such as a touch-screen display, is particularly useful on handheld devices, which are small and may have limited space for user input and output. Improvements in electronic devices with touch-sensitive displays are desirable.

BRIEF DESCRIPTION OF THE DRAWINGS

Embodiments of the present disclosure will now be described, by way of example only, with reference to the attached Figures, in which.

DETAILED DESCRIPTION

Figure 1:
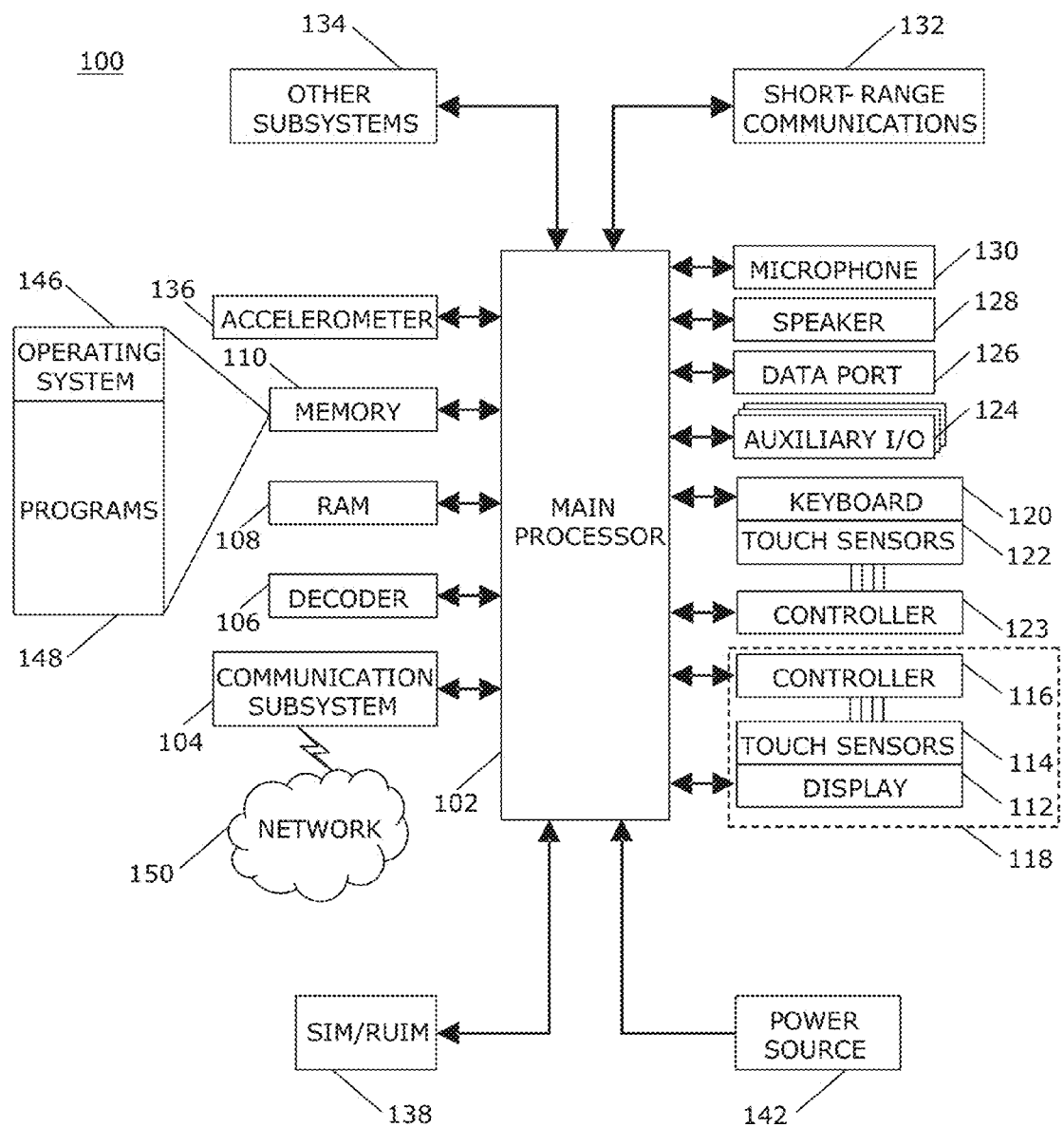
FIG. 1 is a block diagram of an example of a portable electronic device in accordance with the disclosure.

The following describes a portable electronic device and a method of controlling the display of information on a touch-sensitive display of the portable electronic device. The method includes displaying, on the touch-sensitive display, selectable elements in an application screen of an application, in which a first selectable element is located at a first location on the touch-sensitive display and, in response to receipt of an input to enter a display control mode, which in put is detected utilizing touch sensors disposed on keys of a mechanical keyboard, entering the display control mode of the portable electronic device. The method also includes, while in the display control mode and in response to receipt of a gesture on the keys on the mechanical keyboard, moving, by an operating system on the portable electronic device, the application screen on the touch-sensitive display of the electronic device such that the first selectable element is moved to a second location on the touch-sensitive display, wherein the second location is different than the first location and the application screen is moved in a direction based on the gesture. In response to detecting a touch at the second location while the first selectable element is displayed at the second location on the touch-sensitive display, utilizing, by the application, the touch to select the first selectable element. In response to exiting the display control mode, returning the application to an original location on the touch-sensitive display, including returning the first selectable element to the first location.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The keyboard 120 includes a plurality of mechanical keys that include mechanical switches or contacts for input to the electronic device 100 when a mechanical key of the keyboard is depressed by a sufficient amount to oppose a bias of the mechanical key. In addition, touch sensors 122 are disposed on the keyboard and the touch sensors 122 are coupled to a controller 123. Thus, in addition to depression of the mechanical keys of the keyboard 120 for input to the portable electronic device 100, touches on the mechanical keys are also detected for input to the processor 102.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch on a touch-sensitive display 118 may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figure 2:
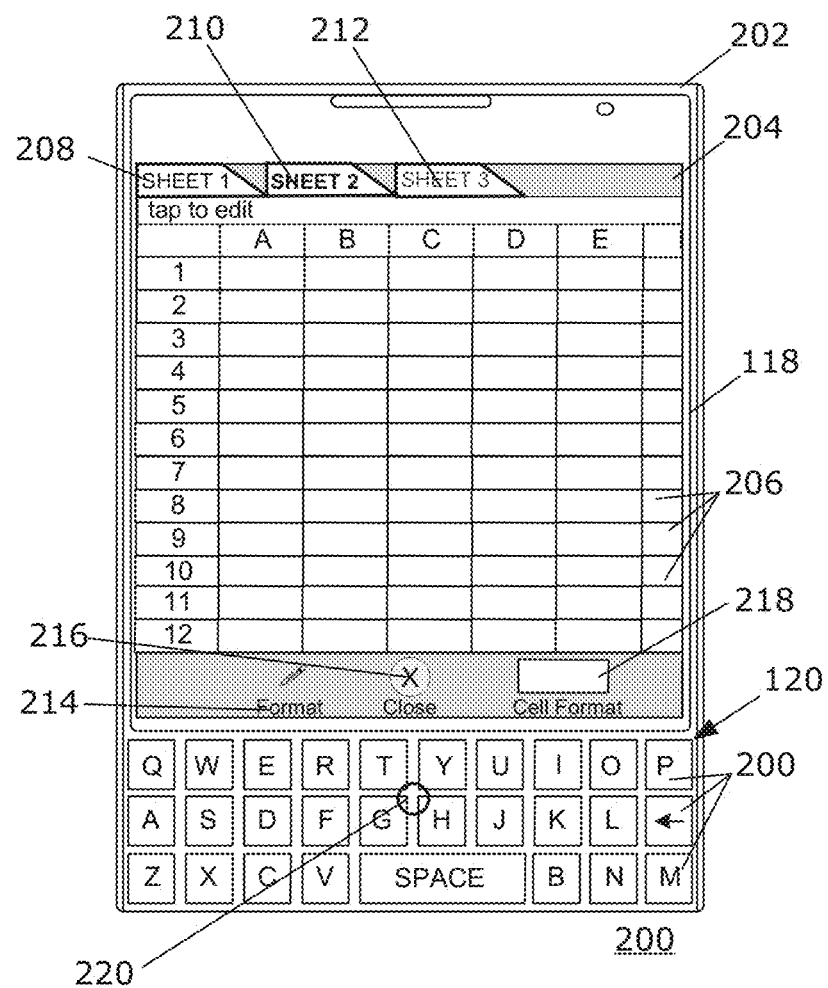
FIG. 2 is a front view of an example of a portable electronic device in accordance with the disclosure.

A front view of an example of the electronic device 100 is shown in FIG. 2. The electronic device 100 includes a housing 202 in which the touch-sensitive display 118 is disposed. The housing 202 is utilized to enclose components such as the components shown in FIG. 1.

The mechanical keyboard 120 is disposed below the touch-sensitive display 118 in the orientation illustrated in FIG. 2. The mechanical keyboard includes a plurality of keys 200. Information may be displayed on the touch-sensitive display 118. For the purpose of the example illustrated in FIG. 2, the processor 102 executes a spreadsheet application and the information displayed includes an application screen 204. The application screen 204 includes a plurality of selectable elements or features, including individual cells 206 of the spreadsheet for entry of data, sheets of the spreadsheet, identified as Sheet 1 208, Sheet 2, 210, and Sheet 3, 212, a Format option 214 to format the font of the text entered in the application screen, a Close option 216 to close the spreadsheet, and a Cell Format option 218 to format the attributes such as line thickness or other attributes of the cells. Each of the selectable elements is selectable, for example, by a touch on area at which the selectable option is displayed on the touch-sensitive display 118.

The application screen may be displayed, for example, in response to receipt of a touch on the touch-sensitive display 118, at a location associated with an application icon from a homescreen of the portable electronic device 100.

Figure 3:
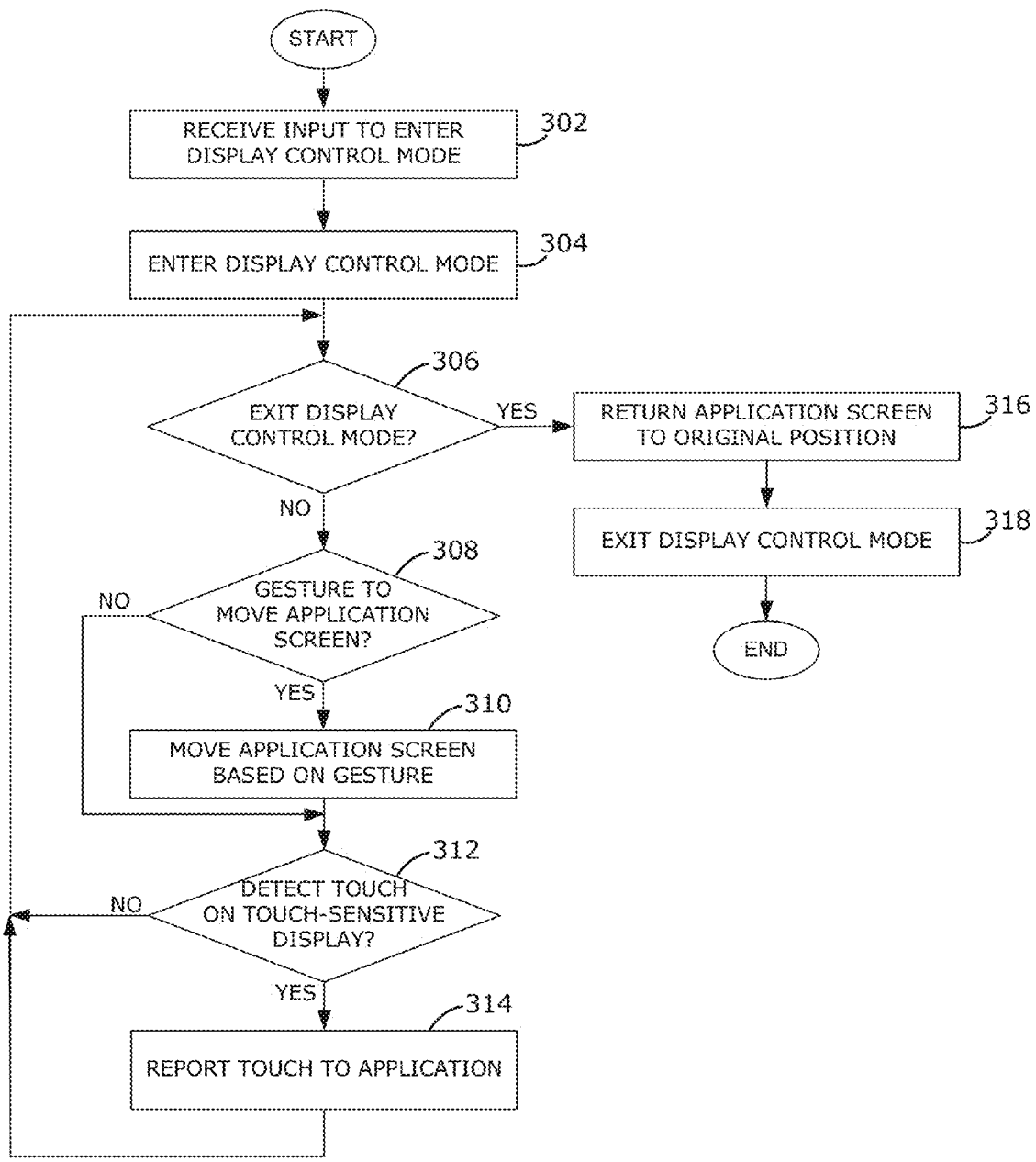
FIG. 3 is a flowchart illustrating a method of controlling a portable electronic device in accordance with the disclosure.
Figure 4:
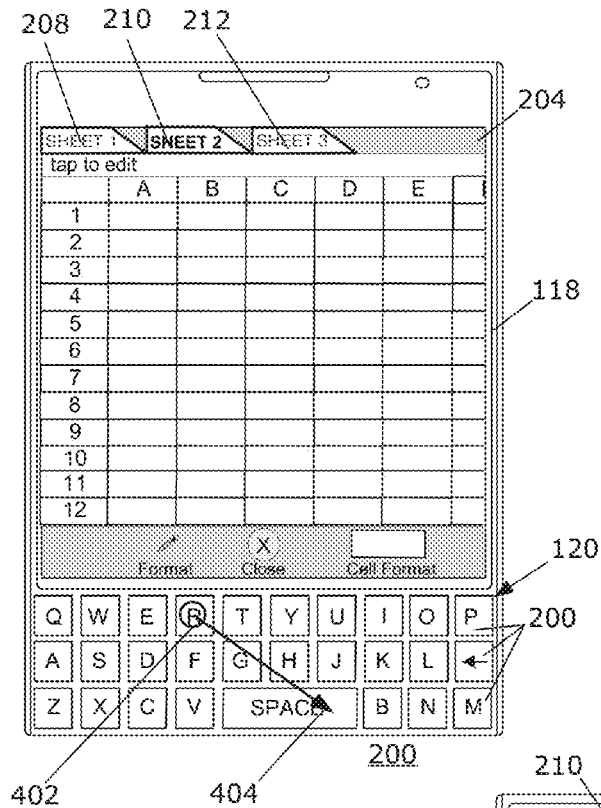
FIG. 4 through FIG. 7 are front views of examples of a portable electronic device in accordance with the disclosure.
Figure 5:
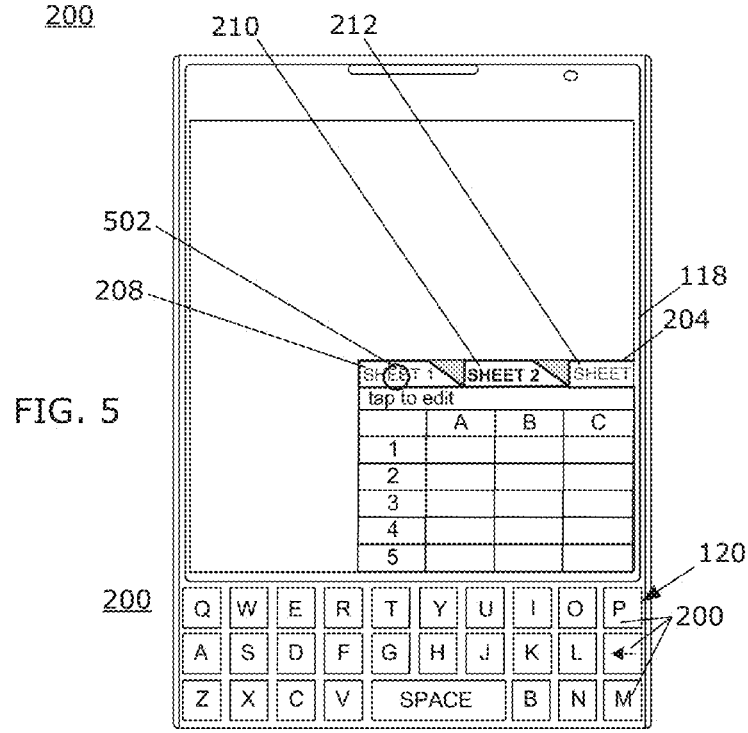
Figure 6:
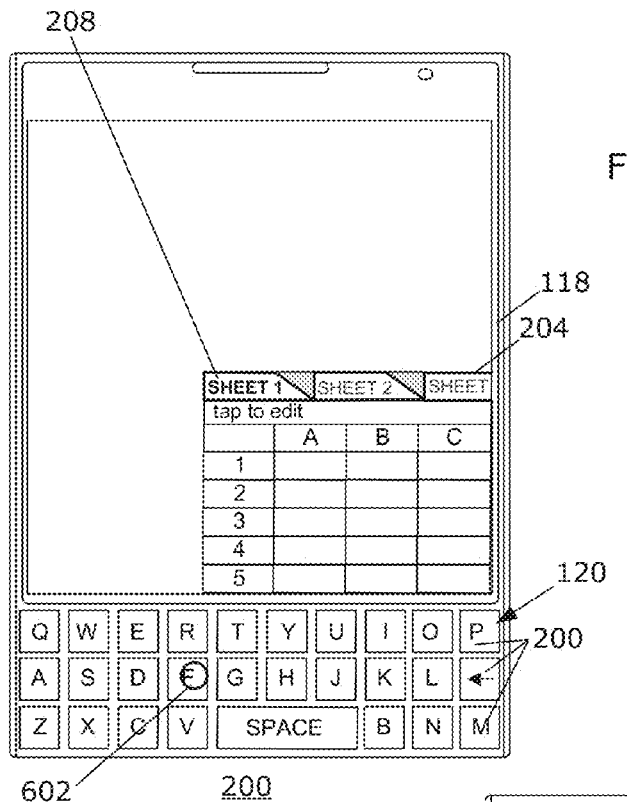

A flowchart illustrating a method of controlling notifications is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The process may be carried out during the execution of any suitable application when an application screen is displayed on the touch-sensitive display 118 of the portable electronic device 100. Thus, the processor executes an application and displays an application screen on the touch-sensitive display 118. An input to enter a display control mode is received at the touch sensors 122 on the keyboard 120 of the portable electronic device at 302. The input to enter the display control mode may be any suitable touch or gesture. For example, the input may be a double tap, which are two touches of relatively short duration compared to a gesture or a selection touch, within a threshold period of time. Alternatively, the input may be a swipe. Any suitable swipe may be utilized to enter the display control mode. For example, a swipe in a particular direction, from a particular starting key, of a specific length or to a particular end key, a multi-touch gesture, or any other swipe may be utilized to enter the display control mode. For example, a swipe beginning on the space key and moving generally upwardly on the keyboard may be utilized for entry into the display control mode.

In response to receipt of the input to enter the display control mode, the portable electronic device 100 enters the display control mode at 304. In the display control mode, the application screen may be repositioned or moved relative to the touch-sensitive display 118. For example, an upper left part of the screen, when viewing the portable electronic device 100 with the keyboard 120 in the upright position, may be moved downwardly, toward the keyboard and to the right to facilitate selection of a selectable element displayed on the touch-sensitive display when the portable electronic device is held with, for example only the right hand.

A decision is made whether to exit the display control mode at 306. The portable electronic device 100 may exit the display control mode at 306 in response to receipt of an input detected utilizing the touch sensors 122 of the keyboard 120. The input to exit the display control mode may be a double tap on a key or keys 200 of the keyboard 120, may be a gesture such as a downward gesture beginning at a specific key 200 of the keyboard 120, a multi-touch gesture in which more than one finger contacts the keyboard, or may be any other suitable gesture that is different from the gestures utilized to move the application screen at 308. Alternatively, the portable electronic device 100 may exit the display control mode in response to selection of a selectable element on the touch-sensitive display 118 such that the portable electronic device 100 automatically exits the display control mode when a touch is detected utilizing the touch sensors 114. The electronic device is maintained in the display control mode until receipt of the input to exit the display control mode. Thus, when the input to exit the display control mode is not received at 306, the process continues at 308.

When a gesture to move the application screen is received at 308, the process continues at 310. The gesture to move the application screen may be any gesture received on the keyboard 120 and detected by the touch sensors 122 disposed on the mechanical keys 200 of the keyboard 120. The gesture may be a gesture beginning at any key 200 of the keyboard 120 or a gesture beginning at a particular location on the keyboard 120.

When the gesture to move the application screen on the touch-sensitive display 118 is detected at 308, the application screen is moved 310 based on the gesture. The direction of the gesture may be determined and the direction of movement of the application screen may be based on the direction of the gesture. For example, the direction of movement of the application screen may be equal to the direction of the gesture. Alternatively or additionally, the distance of the gesture may be determined and the distance of movement of the application screen may be based on the distance of movement of the gesture. For example, the distance of movement of the application screen may be equal to the distance of the gesture or may be a multiple of the distance of movement of the gesture.

When the application screen is moved relative to the touch-sensitive display 118, parts of the application screen are moved off of the touch-sensitive display 118 and are therefore no longer displayed. In the example of moving the application screen down and to the right, a bottom portion and a right side of the application screen are moved off the touch-sensitive and are no longer displayed. Selectable elements displayed in the upper, left corner of the application screen on the application screen are closer to the bottom, right side of the portable electronic device 100 after movement of the application screen, facilitating selection of such elements when the portable electronic device 100 is held in the right hand of the user, for example.

Repositioning or movement of the application screen is controlled by the operating system and is not controlled by the application. Thus, entry into and exit out of the display control mode are controlled by the operating system. When in the display control mode, the gestures received on the keyboard 120 to move the application screen relative to the touch-sensitive display 118 are received at the processor and are utilized by the operating system. Such gestures are not provided to or utilized by the application running on the portable electronic device 100. Although parts of the application screen may be moved off the touch-sensitive display 118, the movement is controlled by the operating system and no changes are made to the application running on the portable electronic device 100 to facilitate such movement.

In response to detecting a touch on the touch-sensitive display at 312, the touch location detected utilizing the touch sensors 114 of the portable electronic device 100 is received by the operating system and the operating system maps the detected touch location to another location on the touch-sensitive display 118 that corresponds to the location of the touch relative to the application screen, prior to movement of the application screen. In other words, the operating system maps the detected touch location to another location to compensate for the movement of the application screen. The operating system provides or reports the other location as the touch location for the touch to the application running on the portable electronic device 100 at 314. For example, when a touch is detected on the touch-sensitive display 118, at a location that corresponds with a location of a selectable element after the application screen is moved, the operating system maps the detected location to the location on the touch-sensitive display at which the same selectable element was displayed prior to movement of the display. Thus, the operating system provides the adjusted or re-mapped touch location to the application such that selection of the selectable element is effected by the application. The application is therefore unaffected and is not notified of any change or movement of the application screen.

The process continues at 316 such that the process continues until an input to exit the display control mode is received at 306.

When the input to exit the display control mode is received at 306, the process continues at 316 and the application screen is returned to the original position. Thus, in response to receipt of the input to exit the display control mode, the application screen is moved back or snaps back such that the selectable elements on the screen are returned to their respective locations prior to movement of the application screen. Thus, the selectable elements displayed at 318 are in the same locations as the same selectable elements displayed prior to entry into the display control mode 302. The portable electronic device 100 exits the display control mode at 318. Thus, further gestures on the keys 200 of the keyboard 120 are not utilized by the operating system to move the application screen when the portable electronic device 100 is not in the display control mode.

Continued reference is made to FIG. 3 and to FIG. 2 and FIG. 4 through FIG. 7, which show front views of examples of a portable electronic device 100. As described above, for the purpose of the example illustrated in FIG. 2, the processor 102 executes a spreadsheet application and the information displayed includes an application screen 204. Although a spreadsheet application is shown and described in the examples herein, the process is also applicable to other applications, such as a messaging application, a word processing application, a drawing application, or any other suitable application.

The application screen 204 includes the cells 206 of the spreadsheet for entry of data, sheets of the spreadsheet, identified as Sheet 1 208, Sheet 2 210, and Sheet 3 212, a Format option 214 to format the font of the text entered in the application screen 204, a Close option 216 to close the spreadsheet, and a Cell Format option 218 to format the attributes such as line thickness or other attributes of the cells. Each of the selectable elements is selectable, for example, by a touch on area at which the selectable option is displayed on the touch-sensitive display 118.

In the example of FIG. 2, Sheet 2 of the spreadsheet is displayed. For the purpose of this example, the portable electronic device 100 is held in the right hand of the user and elements are selected using the right thumb. The selectable element Sheet 1 208 is located in the upper right corner of the application screen 204 and is out of reach of the user's thumb. To move the application screen 204 relative to the touch-sensitive display 118, a user double taps on the keys, as illustrated by the circle 220, which is generally centered on the T, Y, G, and H keys 200 of the keyboard 120 in FIG. 2.

The processor 102 receives the double tap input at 302 and enters the display control mode at 304. An input to exit the display control mode is not received at 306 and a gesture is detected utilizing the touch sensors 122 on the keys 200 of the keyboard 120. The gesture is a swipe beginning at an origin point illustrated by the circle 402 in FIG. 4, on the key associated with the letter R, and following the path illustrated by the arrow 404. The gesture is received utilizing the touch sensors 122 on the keys 200 of the keyboard 120 and is therefore a gesture to move the application screen 204. The gesture is generally downward and to the right on the keyboard 120 and thus, the application screen 204 is moved generally downward and to the right on the touch-sensitive display 118 at 310 and the selectable element 208 is moved from the first location shown in FIG. 4 to the second location shown in FIG. 5. For the purpose of the present example, the application screen 204 moves a distance that is about twice the distance travelled by the swipe on the keyboard.

A touch, illustrated by the circle 502, is detected on the touch-sensitive display 118. The touch is detected at a location that corresponds with the location of the selectable element Sheet 1 208, which is displayed at the second location to which the selectable element 208 was moved. In response to detecting a touch on the touch-sensitive display 118 at 312, the touch location detected utilizing the touch sensors 114 of the touch-sensitive display 118 is received by the operating system and the operating system maps the detected touch location to a location on the touch-sensitive display 118 that corresponds to the first location of the selectable element Sheet 1 208 in FIG. 2, which is the location prior to movement of the application screen 204. The operating system provides the adjusted or remapped location as the touch location to the application at 314 such that selection of the selectable element 208 is effected by the application.

Figure 7:
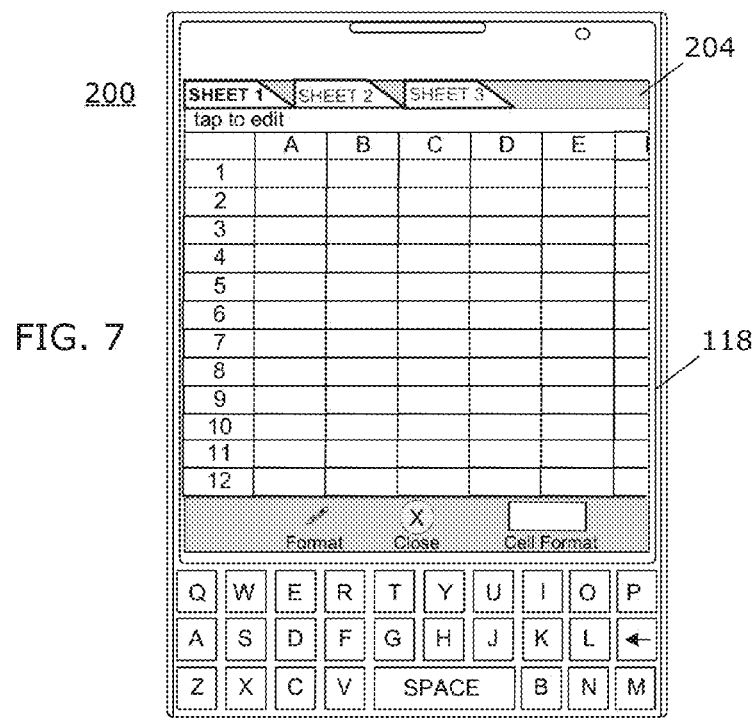

An input to exit the display control mode is received at 316. For the purpose of the present example, the input to exit the display control mode is a double tap detected utilizing the touch sensors 122 on the keys 200 of the keyboard 120, and illustrated by the circle 602 in FIG. 6. The application screen 204 returns to the original position at 316, as illustrated in FIG. 7, and the portable electronic device exits the display control mode at 318.

Advantageously, the portable electronic device enters a display control mode in which the location of an application screen can be controlled. Entry into the display control mode as well as movement of an application screen are both controlled by input utilizing the touch sensors of the mechanical keyboard. Thus, the processor utilizes touches on the display for the application while touches, including gestures, detected by the touch sensors on mechanical keys of the keyboard, are utilized by the operating system to control the mode as well as the movement of the application screen on the electronic device. Gestures and touches on the display screen can still be utilized to interact with the application. Utilizing the display control mode, application screens can be moved on the display such that the user can utilize the portable electronic device with one hand and each selectable feature or element in an application screen can still be selected by the user without repositioning the hand or utilizing a second hand.

According to one example, a method of controlling the display of information on a touch-sensitive display of a portable electronic device is provided. The method includes displaying, on the touch-sensitive display, selectable elements in an application screen of an application, in which a first selectable element is located at a first location on the touch-sensitive display and, in response to receipt of an input to enter a display control mode, which in put is detected utilizing touch sensors disposed on keys of a mechanical keyboard, entering the display control mode of the portable electronic device. The method also includes, while in the display control mode and in response to receipt of a gesture on the keys on the mechanical keyboard, moving, by an operating system on the portable electronic device, the application screen on the touch-sensitive display of the electronic device such that the first selectable element is moved to a second location on the touch-sensitive display, wherein the second location is different than the first location and the application screen is moved in a direction based on the gesture. In response to detecting a touch at the second location while the first selectable element is displayed at the second location on the touch-sensitive display, utilizing, by the application, the touch to select the first selectable element. In response to exiting the display control mode, returning the application to an original location on the touch-sensitive display, including returning the first selectable element to the first location.

According to another example, an electronic device includes a display, a touch-sensitive display for displaying information thereon, a mechanical keyboard including a plurality of keys, touch sensors disposed on the mechanical keyboard for detecting touches thereon, a processor coupled to the touch-sensitive display, the mechanical keyboard, and the touch-sensors disposed on the mechanical keyboard. The processor is operable to execute an application and display, on the touch-sensitive display, selectable elements in an application screen of the application, in which a first selectable element is located at a first location on the touch-sensitive display and, in response to receipt of an input to enter a display control mode, which input is detected utilizing the touch sensors disposed on the mechanical keyboard, enter the display control mode. While in the display control mode, the processor is operable to, in response to receipt of a gesture on the keys on the mechanical keyboard, move, by an operating system on the portable electronic device, the application screen on the touch-sensitive display of the electronic device such that the first selectable element is moved to a second location on the touch-sensitive display, wherein the second location is different than the first location and the application screen is moved in a direction based on the gesture, and in response to detecting a touch at the second location while the first selectable element is displayed at the second location on the touch-sensitive display, utilize, by the application, the touch to select the first selectable element. In response to exiting the display control mode, the processor is operable to return the application to an original location on the touch-sensitive display, including returning the first selectable element to the first location.

The scope of the claims should not be limited by the preferred embodiments set forth in the examples, but should be given the broadest interpretation consistent with the description as a whole.

What is claimed is:

1. A method of controlling display of information on a touch-sensitive display of a portable electronic device, the method comprising:
   displaying, on the touch-sensitive display, selectable elements in an application screen of an application, in which a first selectable element is located at a first location on the touch-sensitive display;
   in response to receipt of an input to enter a display control mode, which input is detected utilizing touch sensors disposed on keys of a mechanical keyboard, entering the display control mode of the portable electronic device;
   while in the display control mode:
      in response to receipt of a gesture on the keys on the mechanical keyboard, moving, by an operating system on the portable electronic device, the application screen on the touch-sensitive display of the electronic device such that the first selectable element is moved to a second location on the touch-sensitive display, wherein the second location is different than the first location and the application screen is moved in a direction based on the gesture;
      in response to detecting a touch at the second location after the application screen is moved and while the first selectable element is displayed at the second location on the touch-sensitive display, mapping, by the operating system, the second location to the first location and reporting the first location for the touch to the application to compensate for the movement of the application screen, and utilizing, by the application, the reported first location of the touch to select the first selectable element such that the application is not notified of the movement of the application screen;
      in response to receipt of the reported touch at the first location while the first selectable element is displayed at the second location on the touch-sensitive display, effecting, by the application, selection of the first selectable element;
   in response to exiting the display control mode, returning the application screen to an original location on the touch-sensitive display, including returning the first selectable element to the first location.

2. The method according to claim 1, wherein the direction that the application screen is moved is equal to a direction of the gesture on the keys of the keyboard.

3. The method according to claim 1, wherein a distance that the application screen is moved corresponds with a distance of the gesture.

4. The method according to claim 1, wherein the portable electronic device exits the display control mode in response to receipt of an input detected by the touch sensors of the keyboard such that entry and exit into the display control mode are controlled by input on the touch sensors of the keyboard.

5. The method according to claim 1, wherein the electronic device is maintained in the display control mode until receipt of an input to exit the display control mode.

6. The method according to claim 1, wherein the electronic device exits the display control mode in response to selection of the first selectable element.

7. The method according to claim 1, wherein the operating system reports touch locations to the application after remapping to compensate for movement of the application screen.

8. The method according to claim 1, wherein in response to detecting a touch on the touch-sensitive display, the touch location is mapped to an other location on the touch-sensitive display to compensate for movement of the application screen.

9. The method according to claim 8, wherein the operating system reports the touch at the other location to the application.

10. A non-transitory computer-readable device having computer-readable code executable by at least one processor of the portable electronic device to perform the method of claim 1.

11. A portable electronic device comprising:
a touch-sensitive display for displaying information thereon;
a mechanical keyboard including a plurality of keys;
touch sensors disposed on the mechanical keyboard for detecting touches thereon;
a processor coupled to the touch-sensitive display, the mechanical keyboard, and the touch-sensors disposed on the mechanical keyboard to:
execute an application and display, on the touch-sensitive display, selectable elements in an application screen of the application, in which a first selectable element is located at a first location on the touch-sensitive display;
in response to receipt of an input to enter a display control mode, which input is detected utilizing the touch sensors disposed on the mechanical keyboard, enter the display control mode;
while in the display control mode:
in response to receipt of a gesture on the keys on the mechanical keyboard, move, by an operating system on the portable electronic device, the application screen on the touch-sensitive display of the electronic device such that the first selectable element is moved to a second location on the touch-sensitive display, wherein the second location is different than the first location and the application screen is moved in a direction based on the gesture;
in response to detecting a touch at the second location after the application screen is moved and while the first selectable element is displayed at the second location on the touch-sensitive display, map, by the operating system, the second location to the first location and reporting the first location for the touch, to the application to compensate for the movement of the application screen; and utilize, by the application, the reported first location of the touch to select the first selectable element such that the application is not notified of the movement of the application screen;
in response to receipt of the reported touch at the first location while the first selectable element is displayed at the second location on the touch-sensitive display, effecting, by the application, selection of the first selectable element;
in response to exiting the display control mode, return the application screen, to an original location on the touch-sensitive display, including returning the first selectable element to the first location.

12. The portable electronic device according to claim 11, wherein the direction that the application screen is moved is equal to a direction of the gesture on the keys of the keyboard.

13. The portable electronic device according to claim 11, wherein a distance that the application screen is moved corresponds with a distance of the gesture.

14. The portable electronic device according to claim 11, wherein the portable electronic device exits the display control mode in response to receipt of an input detected by the touch sensors of the keyboard such that entry and exit into the display control mode are controlled by input on the touch sensors of the keyboard.

15. The portable electronic device according to claim 11, wherein the portable electronic device is maintained in the display control mode until receipt of an input to exit the display control mode.

16. The portable electronic device according to claim 11, wherein the portable electronic device exits the display control mode in response to selection of the first selectable element.

17. The portable electronic device according to claim 11, wherein the operating system reports touch locations to the application after re-mapping to compensate for movement of the application screen.

18. The portable electronic device according to claim 11, wherein in response to detecting a touch on the touch-sensitive display, the touch location is mapped to an other location on the touch-sensitive display to compensate for movement of the application screen.

19. The portable electronic device according to claim 18, wherein the operating system reports the touch at the other location to the application.

* * * * *